United States Patent
Shu et al.

[19]

[11] Patent Number: 5,946,454
[45] Date of Patent: Aug. 31, 1999

[54] IMAGE ENHANCEMENT DURING HALF-TONING USING LOW-PASS AND HIGH-PASS FILTERING

[75] Inventors: Joseph Shu; Chia-Hsin Li, both of San Jose, Calif.

[73] Assignee: Seiko Epson Corporation, Tokyo, Japan

[21] Appl. No.: 08/887,340

[22] Filed: Jul. 2, 1997

Related U.S. Application Data

[60] Provisional application No. 60/028,615, Aug. 15, 1996.

[51] Int. Cl.[6] ................................................ G06F 15/00
[52] U.S. Cl. ........................ 395/109; 382/261; 382/263; 382/264
[58] Field of Search .................... 395/109, 101; 358/455, 456, 457, 458, 459, 460, 298, 465, 466, 447, 534, 535, 536, 429, 512, 448, 467, 518; 382/237, 270, 254, 263, 264, 260, 261, 169, 273, 262, 265, 199, 239, 266; 345/147, 149

[56] References Cited

U.S. PATENT DOCUMENTS

| | | | |
|---|---|---|---|
| 4,547,812 | 10/1985 | Waller et al. | 358/298 |
| 4,783,840 | 11/1988 | Song | 382/261 |
| 4,853,795 | 8/1989 | Morton et al. | 358/447 |
| 4,901,063 | 2/1990 | Kimura et al. | 382/261 |
| 4,941,191 | 7/1990 | Miller et al. | 382/261 |
| 5,023,919 | 6/1991 | Wataya | 382/263 |
| 5,073,959 | 12/1991 | Sugiura et al. | 382/270 |
| 5,210,623 | 5/1993 | Weldy | 358/458 |
| 5,231,677 | 7/1993 | Mita et al. | 382/266 |
| 5,271,064 | 12/1993 | Dhawan et al. | 382/266 |
| 5,351,305 | 9/1994 | Wood et al. | 382/266 |
| 5,381,490 | 1/1995 | Shin | 382/266 |
| 5,438,437 | 8/1995 | Mizoguchi et al. | 358/518 |
| 5,467,422 | 11/1995 | Itihara et al. | 358/298 |
| 5,473,440 | 12/1995 | Haneda et al. | 358/298 |
| 5,724,259 | 3/1998 | Seymour et al. | 382/199 |
| 5,822,465 | 10/1998 | Normile et al. | 382/239 |

OTHER PUBLICATIONS

Jahne, Bernd, "Digital Image Processing," Second Edition, Springer–Verlag, pp. 100–114.

*Primary Examiner*—Dov Popovici
*Attorney, Agent, or Firm*—Mark P. Watson

[57] ABSTRACT

A printer driver employs multi-level dither to limit the size of a look-up table required for its color-correction operation. To suppress some of the resultant artifacts, a filter operation precedes the half-toning operation used to produce the printer input signal. The computation cost of the filter operation is modest because it uses an infinite-impulse-response filter.

21 Claims, 4 Drawing Sheets

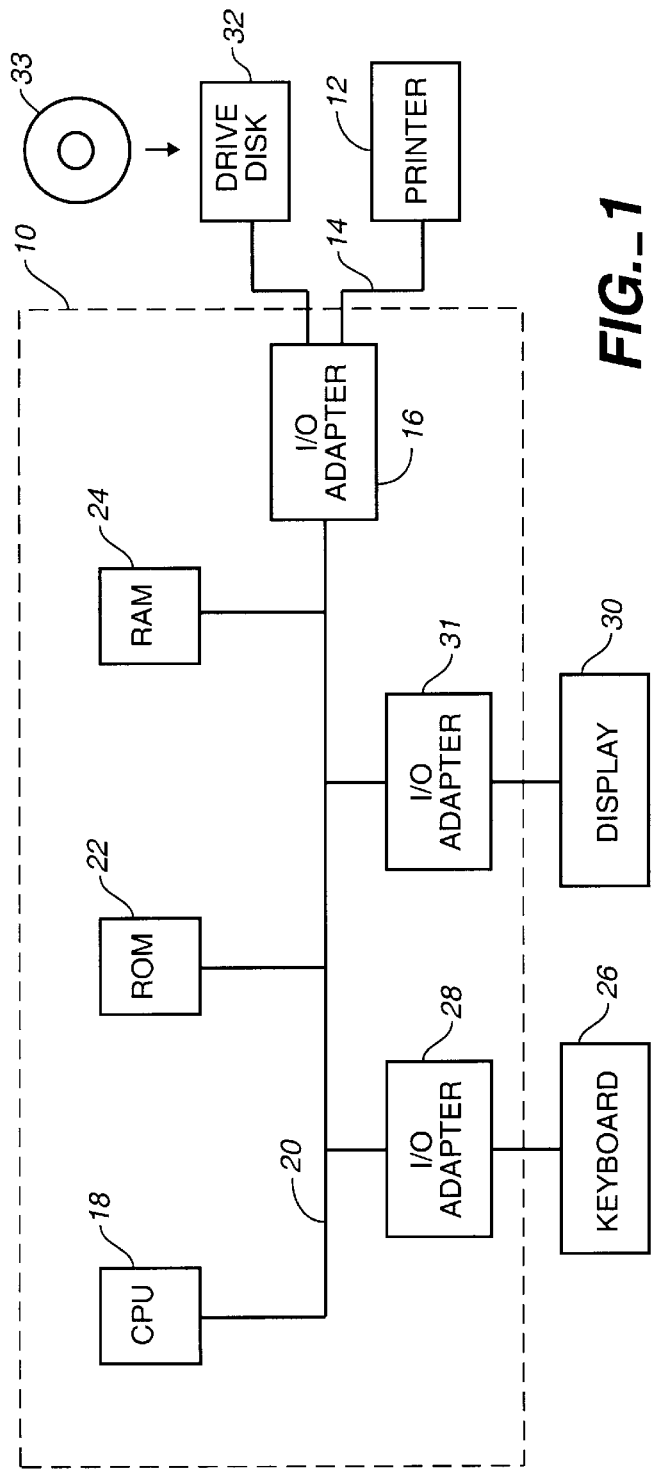
FIG._1
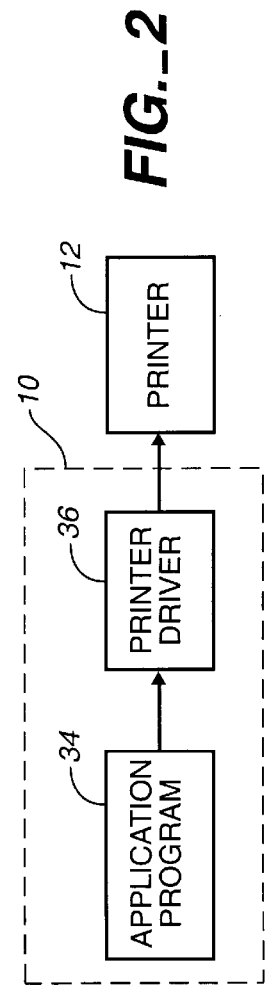
FIG._2

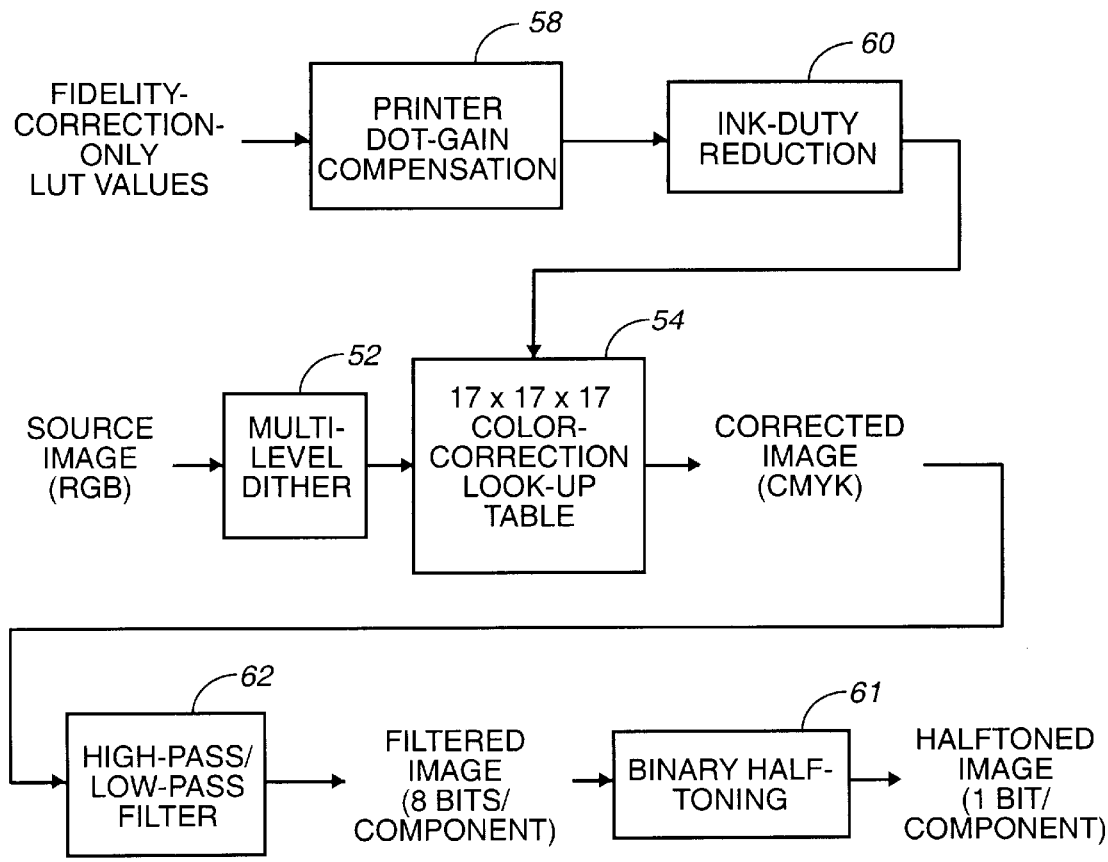
FIG._3
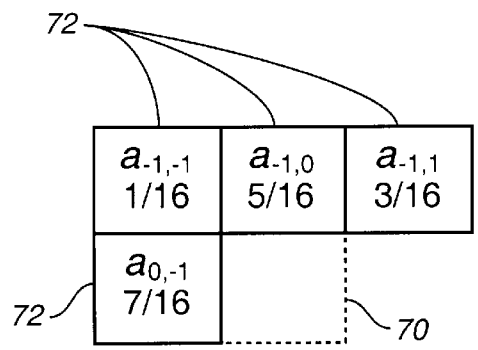
FIG._5

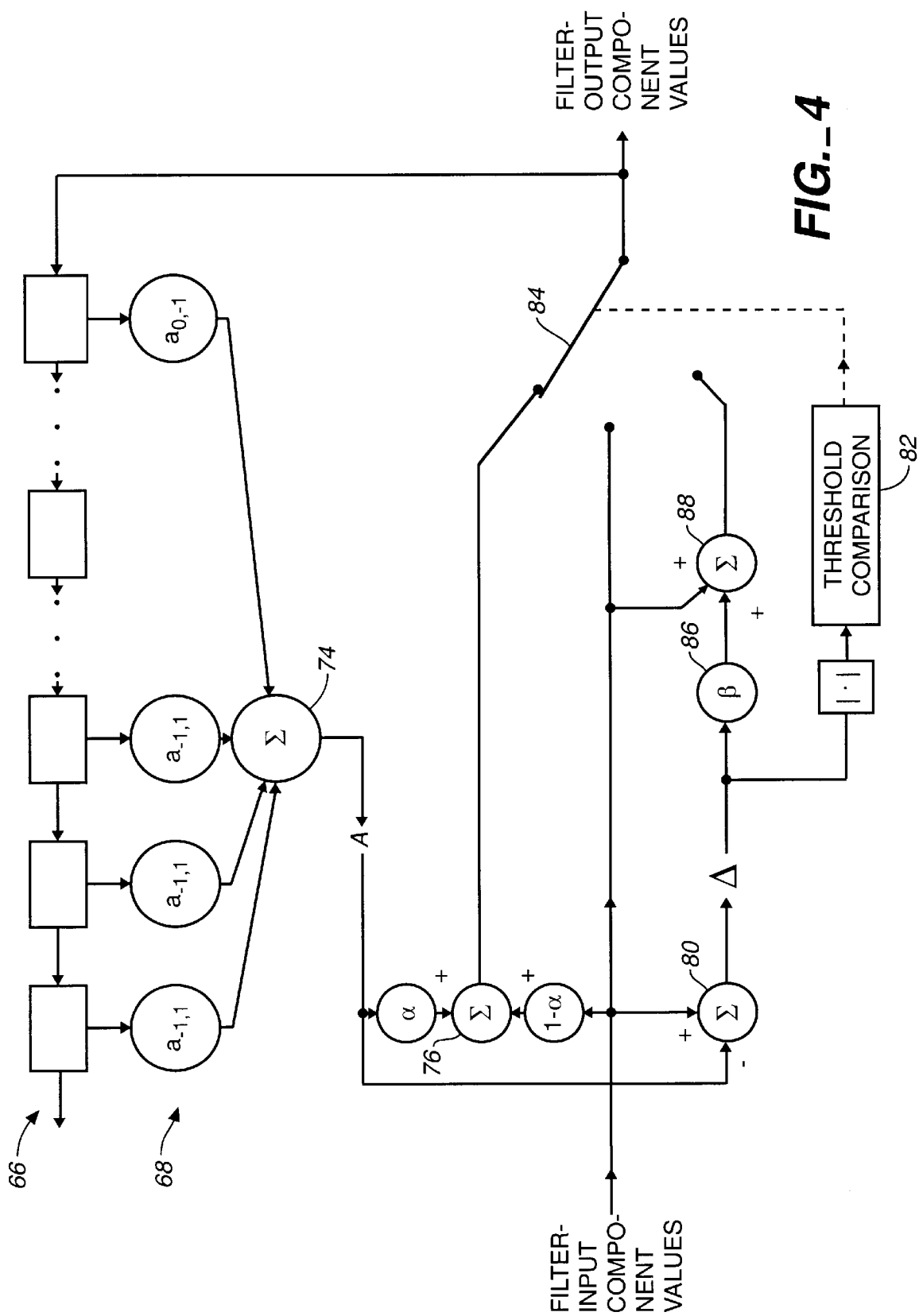
FIG._4

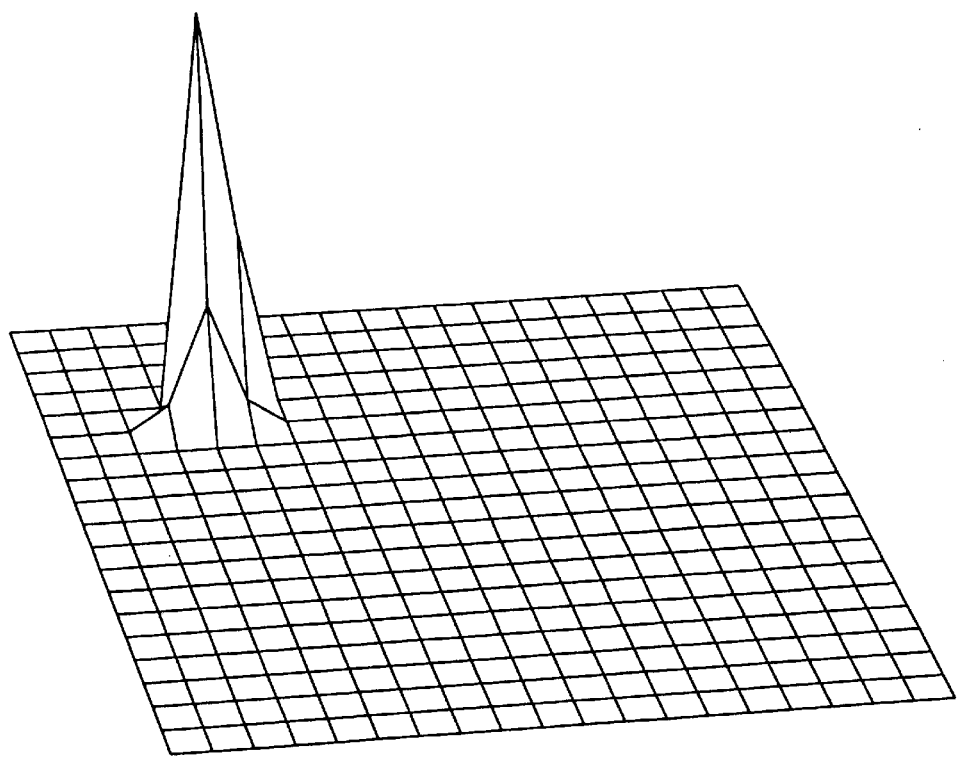
FIG._6
*(PRIOR ART)*
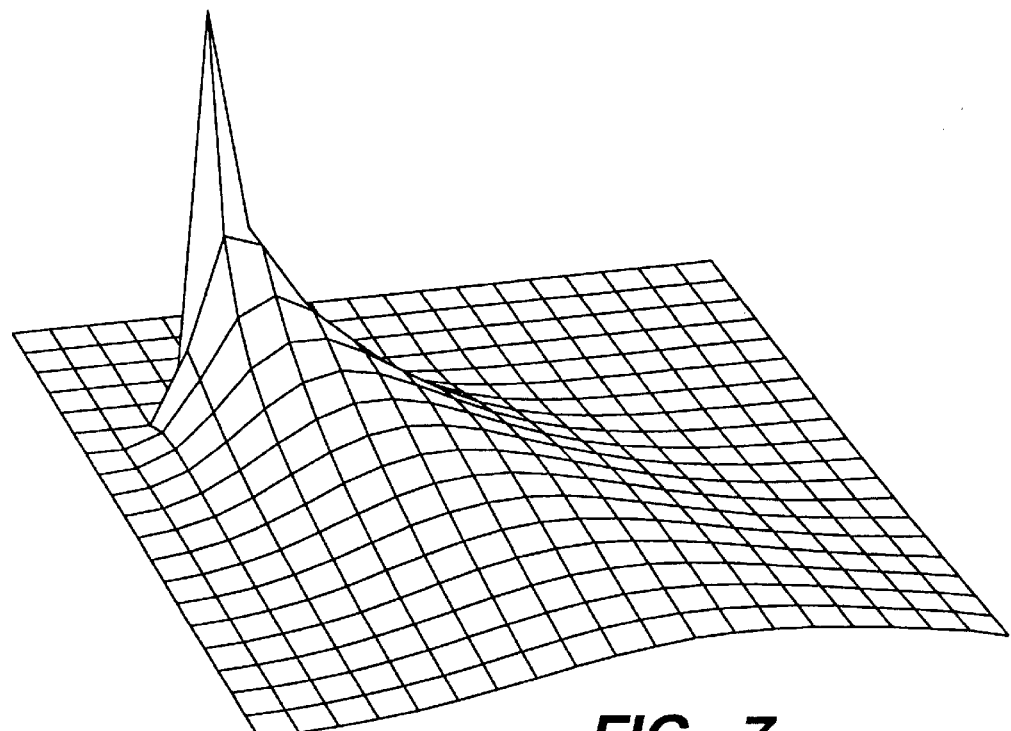
FIG._7

IMAGE ENHANCEMENT DURING HALF-TONING USING LOW-PASS AND HIGH-PASS FILTERING

RELATED APPLICATION

This Application claims the benefit under 35 U.S.C. §119(e) of U.S. Provisional Patent Application Ser. No. 60/028,615, filed Aug. 15, 1996, for Image Enhancement and Screen Generation Techniques, which is hereby incorporated by reference.

BACKGROUND OF THE INVENTION

The present invention concerns image printing. It has particular application to the image filtering that is employed to enhance feature rendering in half-toned images.

In most cases a digitally stored image is represented as pixel values that a device printing the image should attempt to approximate as closely as possible. But obtaining the desired fidelity is complicated by several factors. In the case of an ink-jet printer, for instance, the range of intensities available for a given color component at any given pixel site is merely binary. That is, an ink dot of the given color component can be either deposited or not: there typically is no choice in the size of the ink dot that can be deposited. Therefore, the greater value choice that the stored image's finer value quantization affords is simulated by half-toning, in which the finer-resolution value intended at a particular pixel determines the probability that an ink drop will be deposited at that pixel. Of course, half-toning affects fidelity adversely.

Additionally, the relationship between the apparent color darkness and the dot-deposition probability that will produce that darkness is not linear, so "dot-gain compensation" must be performed on the incoming image in order to increase fidelity. Similar processing must also be performed to compensate for the inaccuracy in the relationship between the primary colors that the stored values represent and the colors of which each ink actually used is capable.

For these and many other reasons, a lot of image processing must be performed in order to maximize the fidelity with which the intended image is rendered. In many cases, this processing involves filtering. Sometimes, high-pass filters are employed to re-emphasize edge features, which half-toning and various other processes tend to suppress. Conversely, low-pass filters are often employed in low-contrast regions in order to suppress processing artifacts that would otherwise be particularly apparent in such regions. Indeed, some systems employ both high- and low-pass filtering the same image: regions identified as being high in contrast are subjected to high-pass filtering for edge enhancement, while regions identified as being low in contrast are subjected to low-pass filtering for smoothing.

When printers that use half-toning employ filtering, they typically use the same filter types that other image-processing applications use. That is, a "kernel" of filter co-efficients conceptually overlays a neighborhood of pixels that are centered on the pixel whose output value is to be computed, the neighborhood-pixel values are multiplied by the co-efficients that respectively overlay them, and the output value is the sum of the resultant products. The filter effect depends both on the filter co-efficients and on the kernel size. In general, a larger low-pass-filter kernel is capable of greater smoothing than a smaller filter kernel.

SUMMARY OF THE INVENTION

We have discovered that the desired filtering of images to be subjected to half-toning can be obtained at relatively modest computational cost by employing infinite-impulse-response filters, i.e., filters in which the filter outputs for at least some pixels are computed not only from filter inputs but also from the filter outputs computed for those pixels' neighbors. As is observed in, for instance, Jähne, *Digital Image Processing*, 2d Ed., Springer-Verlag 1993, pp. 112–113, such filters had not heretofore been considered of much use in image processing, because considerable effort is required to compute the output of a symmetrical-response filter of that type. But we have found that even asymmetrical-infinite-impulse-response filters yield beneficial results in printer applications. Moreover, since the degree of smoothing that can be obtained for a given kernel size is much greater in an infinite-impulse-response filter than in a conventional filter, the computational cost of such a filter is much less.

BRIEF DESCRIPTION OF THE DRAWINGS

The invention description below refers to the accompanying drawings, of which:

FIG. 1 is a hardware-perspective block diagram of a typical system employing the present invention's teachings;

FIG. 2 is a block diagram that depicts the same system from a software standpoint;

FIG. 3 is a block diagram that depicts the processing performed by the printer driver 36 of FIG. 2;

FIG. 4 is a conceptual diagram of the function performed by the filter circuit 62 of FIG. 3;

FIG. 5 is a diagram of the filter kernel that the FIG. 4 filter employs;

FIG. 6 is a plot of the single-pixel-disturbance response of a finite-impulse-response filter whose kernel FIG. 5 depicts; and FIG. 7 is a plot of the single-pixel-disturbance response of an infinite-impulse-response filter having the same kernel.

DETAILED DESCRIPTION OF AN ILLUSTRATIVE EMBODIMENT

FIGS. 1–3 will illustrate a typical system in which the present invention's teachings can be practiced, while its most-characteristic features will be described by reference to FIGS. 4–7.

As the invention description proceeds, it will become apparent that the invention can be embodied in dedicated circuitry designed particularly to implement the invention's teachings. Such an arrangement can be included within a printer that receives instructions that describe an image in terms of finely quantized nominal colors or gray-scale values, and it can include dedicated circuitry that filters the image in the process of converting the requested values to the on-and-off or other low-value-resolution instructions required to render the requested image. But the invention will more typically be implemented by a general-purpose machine, such as a personal computer operating as a printer driver, whose purpose is to convert an image expressed in nominal color values into printer commands that specify the low-level, typically on-or-off operation of a printer that the computer controls.

FIG. 1 depicts a typical hardware environment. A personal computer 10 sends an image-presentation device such as an ink-jet printer 12 low-level instructions, i.e., instructions that specify which individual print-medium pixels should receive dots. The drawing depicts the printer 12 as receiving these instructions by way of an appropriate channel 14. Computers that are capable of practicing the present invention come in a wide variety of configurations, and FIG. 1 depicts one in which channel 14 is provided by an input-output adapter 16 with which a central processing unit 18 communicates by way of an internal bus 20.

Of course, the central processing unit 18 will typically fetch data and instructions at various times from a variety of sources, such as solid-state read-only and random access memories 22 and 24. FIG. 1 also depicts the computer 10 as communicating, as is typical, with a keyboard 26 by way of an interface adapter 28 and with a cathode-ray-tube display 30 by way of a display adapter 31.

The present invention particularly concerns image-presentation devices within this environment. Although the computer 10 can in principle employ the present invention's teachings not only to drive printer 12 but also to form an image on the cathode-ray-tube display 30, this would not be the invention's normal use, because display 30's value quantization is typically much finer—and its spatial resolution much coarser. So we will restrict our attention to the invention's use for operating the printer 12.

In the typical situation, the computer 10 implements the present invention's teachings by acting as a printer driver. The instructions that configure the computer to perform this function are usually contained in the operating-system software transferred through the computer's disc drive 32 to a disc 33 for storage. Often, the driver software will have been loaded into the computer system from another medium such as a diskette, CD-ROM or DVD. In any event, the computer 10 reads the printer-driver instructions from the disc drive in most cases and then performs the below-described functions to implement the present invention's teachings.

FIG. 2 depicts the typical situation from the software standpoint. The present invention's teachings typically come into play when the computer 10 is operating a user's application program 34 and that program makes a system call requesting that an image be printed. The requested operation is carried out by a printer driver 36, which is usually considered to be part of the operating system but is specific to the designated printer. The printer driver's purpose is to convert a device-independent representation of the image into low-level printer instructions to the printer that will render that image as faithfully as the printer's limitations permit.

The filtering operations that particularly distinguish the present invention's embodiments can be employed in many image-processing sequences. The sequence that FIG. 3 depicts is typical. A source image of twenty-four bits per pixel, i.e., eight bits per color component, is subjected to color-correction operations represented by blocks 52 and 54. Multi-level dithering 52 quantizes the source values: each color component in block 52 quantized output can assume one of only seventeen possible values, which are used to address a color-correction memory in block 54. The memory's size can therefore be limited to 17×17×17 instead of the impractical 256×256×256 size that would have been required before multi-level dithering. Commonly assigned U.S. patent application Ser. No. 08/607,074, filed Feb. 26, 1996, by Shu et al. for Generating Color-Correction Look-Up-Table Addresses by Multi-Level Half-Toning, describes these operations further. We incorporate that application by reference.

The table 54 is used to correct certain imperfections in the printing process. To signify this, we have included in FIG. 3 two further blocks 58 and 60, which do not represent real-time operations. Instead, they represent steps that could have been performed in arriving at the look-up-table contents. These steps may start with look-up-table values whose purpose is only to increase color-rendition fidelity; these values simply take into account the non-ideal colors of the inks that various printers employ. A step represented by block 58 may revise those values to take into account the effects that ink-dot shapes, which tend to differ for different media, have on apparent color intensity. We also modify the look-up-table entries, in a step represented by block 60, to limit ink use enough to prevent it from bleeding on paper of the type currently being employed.

In a typical arrangement, each look-up-table location may contain, for example, four four-bit values, one for each of the four ink colors that the printer will use: cyan, magenta, yellow, and black. But the present invention can be practiced in printers and printer drivers—and other image-presentation mechanisms, for that matter—in which the look-up-table parameters are quite different. Indeed, the present invention's broader teachings can be practiced in arrangements that do not employ any look-up table at all.

For each color component, the signal-processing sequence ends with a binary half-toning step 61, whose output indicates for each pixel whether that pixel will receive an ink drop of the type that corresponds to that color component, and that output is sent to the printer. Although the various image-processing operations mentioned so far do serve to improve the printer output's image fidelity, they also tend to introduce artifacts of their own. So some image-presentation systems include a filtering-type image-enhancement operation 62 to suppress some of those artifacts and otherwise enhance the image. FIG. 4 illustrates an example of the type of filtering that distinguishes the present invention. FIG. 4 depicts the filtering for one of the components. The other components are filtered identically.

Although a typical embodiment of the present invention's teachings will implement the filtering process in software, FIG. 4 depicts a hardware arrangement for the sake of explanation. As will be explained below, the FIG. 4 circuit can operate as a low-pass filter or as a high-pass filter, and it can also simply forward its input without performing any filtering at all. When it does perform filtering, it computes the filter output for a given pixel not only from the input value for that pixel and its neighbors but also, in accordance with the present invention, from neighboring pixels' output values. This use of output values, rather than only input values, gives the filter its infinite-impulse-response character and enables it to provide more smoothing than conventional filters do for a given kernel size.

A (conceptual) shift register 66 one stage greater in length than the number of pixels in an image row stores the previous outputs, and operations represented by multipliers 68 compute the products of those values and filter-kernel co-efficients of which FIG. 5 sets forth exemplary values. FIG. 5's dashed-line box 70 represents the position of the pixel whose output value is being computed, and its solid-line boxes 72 represent the relative positions of the pixels whose previously determined output values the filter uses to generate that output value.

A summation operation 74 (FIG. 4) computes the sum A of the resultant products. Another summation operation 76 takes a weighted average of the subject pixel's input value and the weighted neighborhood output-value average A. If the filter is to operate in its low-pass mode, the result is the filter output. The number of possible filter input values is limited to the relatively small number of look-up-table locations, but the filtering operation results in a greater number of possible values for the sum A, and, even though a further half-toning operation follows the filter operation, we believe that the filter-operation output's finer granularity tends to suppress some artifacts that the look-up-table operation's coarser granularity introduces.

To determine whether to use the low-pass function, a comparison operation 80 computes the difference Δ between the average A and the input value. If that difference's magnitude is lower than a predetermined low-pass threshold, as determined in a threshold-comparison operation 82, then the filter operates in its low-pass mode, as an (again, conceptual) switch 84 indicates.

If Δ's magnitude exceeds a predetermined high-pass threshold, on the other hand, the filter computes a high-pass output. In operation 86, it computes the product of the difference Δ and a proportionality constant β, and it adds the result to the input in operation 88. (Inspection reveals that the "high-pass" filter output does include a DC component; i.e., by high-pass we mean a response that emphasizes changes, even though it may not filter out all low-spatial-frequency components.)

The high- and low-pass thresholds may be the same. If not, one approach is simply to employ the input as the output if the difference Δ is between the two threshold values, as three-position switch 84 indicates.

We have discovered that, despite the limitations ordinarily thought to afflict the infinite-impulse-response filters' use in image processing, employing them in half-toning applications can yield significant improvements in image quality, and we have thereby is been able to take advantage of their modest computational cost. FIGS. 6 and 7 illustrate that advantage.

FIGS. 6 and 7 depict responses of finite- and infinite-impulse-response filters, respectively, to a single-pixel disturbance. The two-dimensional "horizontal" position represents location in the output image, and the "height" represents the filter output. In other words, the height represents the output-image darkness in response to an input image whose pixel value at, say, (4,4) is 255 and zero everywhere else.

In both drawings, the filter kernel is the one that FIG. 5 illustrates. But any given pixel's output value in the conventional, FIG. 6 case depends only on the input values of a neighborhood as small as the filter kernel, so even the small, twenty-pixel-square region that FIG. 6 illustrates dwarfs the response of a conventional, finite-impulse-response filter. It is clear that a much larger kernel, and therefore much more computation, is necessary if any significant smoothing effect is to be obtained. But the same kernel size yields a much larger response in an infinite-impulse-response filter, as FIG. 7 shows, because that kernel is applied to output values rather than input values, so the input values' effects tend to propagate. Therefore, a given pixel's output value depends on a large number of input values. Indeed, the output pixel value for the pixel at the lower right-hand corner theoretically receives contributions from all input values.

So employing the present invention's teachings provides desired image enhancement at a computational cost much lower than conventional approaches impose. It therefore constitutes a significant advance in the art.

What is claimed is:

1. A method for operating an image-presenting mechanism responsive to an application thereto of electrical command signals to display an image that the command signals represent, the method comprising the steps of:

A) performing a sequence of image-revision steps, in which sequence each image-revision step receives electrical input signals representing an input image consisting of input pixels that the input signals represent as respective input-pixel values and produces therefrom electrical output signals representing an output image consisting of output pixels that the output signals represent as respective output-pixel values, the input image of the first image-revision step is a source image, the input image of any subsequent image-revision step is the output image of the preceding image-revision step, and in which:
    i) one said image-revision step is a half-toning step whose input image is input signals represent in a relatively fine-resolution pixel values and whose output image is output signals representing relatively coarse-resolution pixel values; and
    ii) one said image-revision step, which precedes the half-toning step, is an infinite-impulse-response-filter step, the values of each of a plurality of output pixels, for at least some input images, is a filter function of the value of an input pixel corresponding to that output pixel and of the values of a respective plurality of the infinite-impulse-response-filter step's other output pixels; and B) applying to the image-presenting mechanism the electrical command signals that represent the output image produced by the last image-revision step.

2. A method as defined in claim 1 wherein the filter function is a high-pass-filter function for at least some output pixels.

3. A method as defined in claim 2 wherein the filter function for any given output pixel is a high-pass-filter function if the magnitude of the difference between the value of the corresponding input pixel and a weighted sum of the values of the output pixels in a predetermined neighborhood of the given output pixel exceeds a predetermined high threshold.

4. A method as defined in claim 3 wherein the filter function for any given output pixel is a low-pass-filter function if the magnitude of the difference between the value of the corresponding input pixel and a weighted sum of the values of the output pixels in a predetermined neighborhood of the given output pixel is less than a predetermined low threshold.

5. A method as defined in claim 4 wherein the high and low thresholds are equal.

6. A method as defined in claim 1 wherein the filter function is a low-pass-filter function for at least some output pixels.

7. A method as defined in claim 6 wherein the filter function for any given output pixel is a low-pass-filter function if the magnitude of the difference between the value of the corresponding input pixel and a weighted sum of the values of the output pixels in a predetermined neighborhood of the given output pixel is less than a predetermined low threshold.

8. A method as defined in claim 6 wherein one said image-revision step is a second half-toning step, which precedes the infinite-impulse-response-filter step.

9. A method as defined in claim 1 wherein one said image-revision step is a second half-toning step, which precedes the infinite-impulse-response-filter step.

10. A storage medium containing instructions readable by a computer to configure the computer to function as an apparatus for operating an image-presenting mechanism responsive to an application thereto of electrical command signals to display an image that the command signals represent, the apparatus comprises:

A) An image-revision circuitry, responsive to electrical source-image signals representing a source image, for performing a sequence of image-revision steps, in which sequence each image-revision step receives electrical input signals representing an input image consisting of input pixels that the input signals represent as respective input-pixel values and produces therefrom electrical output signals representing an output image consisting of output pixels that the output signals represent as respective output-pixel values, the input image of the first image-revision step is the source image, the input image of any subsequent image-revision step is the output image of the preceding image-revision step, and in which:

i) one said image-revision step is a half-toning step whose input image is input signals representing relatively fine-resolution pixel values and whose output image is output signals representing relatively coarse-resolution pixel values; and ii) one said image-revision step, which precedes the half-toning step, is an infinite-impulse-response-filter step, the values of each of a plurality of output pixels, for at least some input images, is a filter function of the value of an input pixel corresponding to that output pixel and of the values of a respective plurality of the infinite-impulse-response-filter step's other output pixels; and B) An output circuitry responsive to the image-revision circuitry for applying to the image-presenting mechanism the electrical command signals that represent the output image produced by the last image-revision step.

11. A storage medium as defined in claim 10 wherein the filter function is a high-pass-filter function for at least some output pixels.

12. A storage medium as defined in claim 11 wherein the filter function for any given output pixel is a high-pass-filter function if the magnitude of the difference between the value of the corresponding input pixel and a weighted sum of the values of the output pixels in a predetermined neighborhood of the given output pixel exceeds a predetermined high threshold.

13. A storage medium as defined in claim 12 wherein the filter function for any given output pixel is a low-pass-filter function if the magnitude of the difference between the value of the corresponding input pixel and a weighted sum of the values of the output pixels in a predetermined neighborhood of the given output pixel is less than a predetermined low threshold.

14. A storage medium as defined in claim 13 wherein the high and low thresholds are equal.

15. A storage medium as defined in claim 10 wherein the filter function is a low-pass-filter function for at least some output pixels.

16. A storage medium as defined in claim 15 wherein the filter function for any given output pixel is a low-pass-filter function if the magnitude of the difference between the value of the corresponding input pixel and a weighted sum of the values of the output pixels in a predetermined neighborhood of the given output pixel is less than a predetermined low threshold.

17. A storage medium as defined in claim 15 wherein one said image-revision step is a second half-toning step, which precedes the infinite-impulse-response-filter step.

18. A storage medium as defined in claim 10 wherein one said image-revision step is a second half-toning step, which precedes the infinite-impulse-response-filter step.

19. An apparatus for operating an image-presenting mechanism responsive to the application thereto of electrical command signals to display an image that the command signals represent, said apparatus comprising:

A) An image-revision circuitry, responsive to electrical source-image signals representing a source image, for performing a sequence of image-revision steps, in which sequence each image-revision step receives electrical input signals representing an input image consisting of input pixels that the input signals represent as respective input-pixel values and produces therefrom electrical output signals representing an output image consisting of output pixels that the output signals represent as respective output-pixel values, the input image of the first image-revision step is the source image, the input image of any subsequent image-revision step is the output image of the preceding image-revision step, and in which:

i) one said image-revision step is a half-toning step whose input image is input signals representing relatively fine-resolution pixel values and whose output image is output signals representing relatively coarse-resolution pixel values; and ii) one said image-revision step, which precedes the half-toning step, is an infinite-impulse-response-filter step, the values of each of a plurality of output pixels, for at least some input images, is a filter function of the value of an input pixel corresponding to that output pixel and of the values of a respective plurality of the infinite-impulse-response-filter step's other output pixels; and B) An output circuitry responsive to the image-revision circuitry for applying to the image-presenting mechanism the electrical command signals that represent the output image produced by the last image-revision step.

20. An apparatus as defined in claim 19 wherein the filter function is a low-pass-filter function for at least some output pixels.

21. An image-presentation system comprising:

A) An image-revision circuitry, responsive to electrical source-image signals representing a source image, for performing a sequence of image-revision steps, in which sequence each image-revision step receives electrical input signals representing an input image consisting of input pixels that the input signals represent as respective input-pixel values and produces therefrom electrical output signals representing an output image consisting of output pixels that the output signals represent as respective output-pixel values, the input image of the first image-revision step is the source image, the input image of any subsequent image-revision step is the output image of the preceding image-revision step, and in which:

i) one said image-revision step is a half-toning step whose input image is input signals representing relatively fine-resolution pixel values and whose output image is output signals representing relatively coarse-resolution pixel values; and ii) one said image-revision step, which precedes the half-toning step, is an infinite-impulse-response-filter step, the values of each of a plurality of output pixels, for at least some input images, is a filter function of the value of an input pixel corresponding to that output pixel and of the values of a respective plurality of the infinite-impulse-response-filter step's other output pixels;

B) an image-presenting mechanism responsive to the application thereto of electrical command signals to present an image that the command signals represent; and C) An output circuitry responsive to the image-revision circuitry for applying to the image-presenting mechanism the electrical command signals that represent the output image produced by the last image-revision step.

* * * * *

UNITED STATES PATENT AND TRADEMARK OFFICE
CERTIFICATE OF CORRECTION

PATENT NO.    : 5,946,454
DATED         : August 31, 1999
INVENTOR(S)   : Joseph Shu, et al.

It is certified that an error appears in the above identified patent and that said Letters Patent is hereby corrected as shown below:

Column 6, line 12, change "represent in a" to --representing--.

Signed and Sealed this

Twenty-second Day of February, 2000

Attest:

Q. TODD DICKINSON

*Attesting Officer*    *Commissioner of Patents and Trademarks*